(12) United States Patent
Tenzer

(10) Patent No.: US 9,680,140 B2
(45) Date of Patent: Jun. 13, 2017

(54) BATTERY ANODE COMPONENT FOR A BATTERY CELL AND METHOD FOR MANUFACTURING A BATTERY ANODE COMPONENT FOR A BATTERY CELL

(71) Applicant: Robert Bosch GmbH, Stuttgart (DE)

(72) Inventor: Martin Tenzer, Nuertingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 211 days.

(21) Appl. No.: 14/367,099

(22) PCT Filed: Nov. 19, 2012

(86) PCT No.: PCT/EP2012/072940
§ 371 (c)(1),
(2) Date: Jun. 19, 2014

(87) PCT Pub. No.: WO2013/092048
PCT Pub. Date: Jun. 27, 2013

(65) Prior Publication Data
US 2014/0377604 A1 Dec. 25, 2014

(30) Foreign Application Priority Data
Dec. 20, 2011 (DE) .................. 10 2011 089 174

(51) Int. Cl.
*H01M 2/34* (2006.01)
*H01M 4/04* (2006.01)
(Continued)

(52) U.S. Cl.
CPC .............. *H01M 2/14* (2013.01); *H01M 2/145* (2013.01); *H01M 2/34* (2013.01); *H01M 4/04* (2013.01);
(Continued)

(58) Field of Classification Search
None
See application file for complete search history.

(56) References Cited

U.S. PATENT DOCUMENTS 4,003,753 A * 1/1977 Hall .................... H01M 4/0461
429/199
4,398,346 A 8/1983 Underhill et al.
(Continued)

FOREIGN PATENT DOCUMENTS

DE 10 2009 007422 8/2010
DE WO 2010089079 A1 * 8/2010 ............... B60K 1/04
WO 2011/058416 5/2011

*Primary Examiner* — Daniel Gatewood
(74) *Attorney, Agent, or Firm* — Gerard Messina

(57) ABSTRACT

A battery anode component for a battery cell including a current collector component having a lithium receiving side in which at least two spatially separated recesses are formed as lithium receiving chambers, at least two lithium-based anode material units which are situated in the at least two lithium receiving chambers, and a protective cover which covers the lithium receiving side at least partially and with the aid of which outer surfaces of the at least two lithium-based anode material units which are exposed by the current collector component are covered. A method is also described for manufacturing a battery anode component for a battery cell.

20 Claims, 3 Drawing Sheets

(51) Int. Cl.

| | |
|---|---|
| *H01M 4/76* | (2006.01) |
| *H01M 2/14* | (2006.01) |
| *H01M 4/134* | (2010.01) |
| *H01M 4/1395* | (2010.01) |
| *H01M 4/38* | (2006.01) |
| *H01M 10/052* | (2010.01) |
| *H01M 10/42* | (2006.01) |
| *H01M 10/058* | (2010.01) |
| H01M 4/66 | (2006.01) |
| H01M 4/02 | (2006.01) |

(52) U.S. Cl.
CPC ......... *H01M 4/0473* (2013.01); *H01M 4/134* (2013.01); *H01M 4/1395* (2013.01); *H01M 4/382* (2013.01); *H01M 4/76* (2013.01); *H01M 10/052* (2013.01); *H01M 10/058* (2013.01); *H01M 10/4235* (2013.01); H01M 4/661 (2013.01); H01M 2004/027 (2013.01); H01M 2220/20 (2013.01); Y02P 70/54 (2015.11); Y02T 10/7011 (2013.01); Y10T 29/49108 (2015.01)

(56) References Cited

U.S. PATENT DOCUMENTS

2008/0226975 A1\* 9/2008 Kang ................. H01M 10/052
429/122
2012/0164496 A1\* 6/2012 Lachenmeier ........... B60K 1/04
429/61

\* cited by examiner

BATTERY ANODE COMPONENT FOR A BATTERY CELL AND METHOD FOR MANUFACTURING A BATTERY ANODE COMPONENT FOR A BATTERY CELL

FIELD OF THE INVENTION

The present invention relates to a battery anode component for a battery cell. The present invention likewise relates to a battery cell and a battery. Furthermore, the present invention relates to a method for manufacturing a battery anode component for a battery cell, a method for manufacturing a battery cell and a method for manufacturing a battery.

BACKGROUND INFORMATION

German patent document DE 10 2009 007 422 A1 discusses a battery receiving device. The battery receiving device has a battery receiving chamber which may be filled with several batteries. In order to fill the battery receiving chamber, a battery device which holds the batteries is inserted into the battery receiving chamber. With the aid of two clamping strips of the battery device, a movement of the batteries is also to be guidable in addition to a holding of the batteries, in such a way that the batteries are to be deflectable into an evasion area in the case of a strong negative acceleration of the battery receiving device. Moreover, the battery receiving device also has a deforming element through the deformation of which, in the event of an accident, at least a part of a released energy is to be absorbed.

SUMMARY OF THE INVENTION

The present invention provides a battery anode component for a battery cell having the features described herein, a battery cell having the features described herein, a battery having the features described herein, a method for manufacturing a battery anode component for a battery cell having the features described herein, a method for manufacturing a battery cell having the features described herein, and a method for manufacturing a battery having the features described herein.

The present invention is intended to ensure an encapsulation of the total lithium quantity of a battery anode component in defined partitions. In this way, the total lithium quantity of a battery anode component is integratable therein with the aid of the present invention in such a way that in the case of damage which results at least in a partial mechanical destruction of the battery anode component hardly any lithium is released.

Exposed lithium may carry out an exothermal reaction with air humidity during which hydrogen is formed. Moreover, lithium is readily flammable. Thus, even a small initial hydrogen ignition may result in an ignition of the lithium. Such a lithium fire is conventionally inextinguishable by firefighting water, since the firefighting water which enters the partially destroyed battery anode component frequently reacts with the lithium still present therein.

The present invention resolves the problems conventionally occurring in the case of lithium anodes with the aid of the advantageous encapsulation of the total lithium quantity of the battery anode component in defined partitions. With the aid of the present invention, a battery anode component including lithium is thus provided which does not pose a risk originating from the lithium present therein in the case of a destruction of/damage to the battery anode component. Since the battery anode components, in particular lithium anodes, are frequently used in the battery technology of an electric vehicle, the present invention thus increases the acceptance of the entire battery technology of an electric vehicle.

It is pointed out that by advantageously covering the at least two lithium-based anode material units with the aid of the protective cover, humidity and contamination are reliably prevented from entering the lithium-based anode material units. The advantageous battery anode component may thus be exposed to air humidity or rain, without an ignition of the lithium occurring.

The battery anode component according to the present invention may be implemented as a lithium anode, in particular as a lithium alloy anode or as a lithium metal anode, for example. In this way, the present invention provides a significant increase in safety of a plurality of lithium-based anodes.

In one advantageous specific embodiment, at least one predetermined breaking point is configured in the current collector component between two adjacent lithium receiving chambers. In this case, energy is removable by a break of the at least one predetermined breaking point in the case of a mechanical force acting on the battery anode component. In this way, even a significant force which acts on the battery anode component causes only enclosed lithium fragments to be released. A direct contact between a released lithium and aerial oxygen, air humidity and/or water, e.g., in the form of rain or firefighting water, is thus reliably prevented.

The at least one predetermined breaking point may additionally extend through the protective cover. This additionally increases the safety of the battery anode component in the case of a great mechanical force acting on the battery anode component.

The protective cover may be formed from at least one ion-conductive material. For example, the protective cover may include a polymer or a ceramic material. Thus, an advantageous functionality of the battery anode component may be reliably ensured due to the corresponding configuration of the protective cover.

Alternatively or additionally, the current collector component may include nickel, copper and/or a stainless steel for this purpose. The materials listed here do not react with lithium and therefore ensure a comparably long service life of the lithium-based battery anode component.

In one exemplary specific embodiment, the at least two lithium receiving chambers are formed at the lithium receiving side of the current collector component in such a way that a web-shaped partition wall element protrudes from the bottom surfaces of two adjacent lithium receiving chambers in each case. Such a configuration of the current collector component ensures the advantageous, spatially separated configuration of the at least two receiving chambers which cause the encapsulation of the total lithium material of the battery anode component in defined partitions.

The above-stated advantages are also ensured for a battery cell including such a battery anode component.

A battery including at least one battery anode component of this type and/or at least one corresponding battery cell also results in the advantages listed above.

The advantages mentioned above may be likewise achieved by a corresponding method for manufacturing a battery anode component for a battery cell.

In one advantageous embodiment of the method, the at least one predetermined breaking point is formed at least in the current collector component with the aid of a laser process. In particular, the at least one predetermined breaking point may also be structured through the protective cover with the aid of the laser process. It is pointed out that the laser process represents a cost-effective and easily accomplishable possibility of forming the at least one predetermined breaking point.

Moreover, the at least two lithium receiving chambers in the current collector component and/or the at least one predetermined breaking point in the current collector component may be formed with the aid of a rolling process. The at least two lithium receiving chambers and/or the at least one predetermined breaking point may also be easily formed with the aid of such a method step.

In order to ensure the advantages described above, a corresponding method for manufacturing a battery cell may also be carried out.

Furthermore, the advantages mentioned above may be implemented with the aid of a corresponding method for manufacturing a battery.

Additional features and advantages of the present invention are explained in the following on the basis of the figures.

DETAILED DESCRIPTION

FIGS. 1a through 1d show cross sections for schematically illustrating one specific embodiment of the method for manufacturing a battery anode component.

The method which is represented in the FIGS. 1a through 1d is used to manufacture a battery anode component, e.g., a battery anode, which has a lithium-based anode material instead of or in addition to graphite. The lithium-based anode material may be, for example, lithium or a lithium alloy such as a lithium metal in particular. It is pointed out that the implementability of the method described in the following is not limited to the utilization of a certain lithium-based anode material.

Figure 1A:
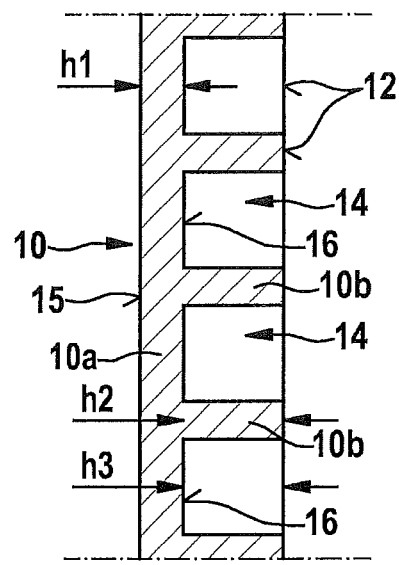
FIG. 1a shows a cross section for schematically illustrating one specific embodiment of the method for manufacturing a battery anode component.

In a method step which is represented with the aid of FIG. 1a, a current collector component 10 having a lithium receiving side 12 is formed. At least two spatially separated recesses are formed as lithium receiving chambers 14 in lithium receiving side 12. A plurality of lithium receiving chambers 14 may, for example, be formed at current collector component 10.

The shaping/texturizing/structuring of current collector component 10 having the at least two lithium receiving chambers 14 may take place, for example, in that at least one web-shaped partition wall element 10b, which extends from base plate 10a toward lithium receiving side 12, is formed on a base plate 10a which is assigned to/forms a side 15 of current collector component 10 which is directed against lithium receiving side 12. The at least one web-shaped partition wall element 10b is advantageously formed in such a way that it protrudes from bottom surfaces 16 of two adjacent lithium receiving chambers 14 and spatially separates the two adjacent lithium receiving chambers 14 in this way. Moreover, an outer frame (not illustrated) which also extends toward lithium receiving side 12 may be formed on base plate 10a. A plurality of web-shaped partition wall elements 10b may be formed which protrude at base plate 10a.

The distances between two adjacent web-shaped partition wall elements 10b or the width of a lithium receiving chamber 14 (parallel to its bottom surface 16) may range between 100 μm and 25 mm. A first height h1 of base plate 10a (which is oriented perpendicularly to side 15) and/or a second height h2 of a web-shaped partition wall element 10b (which is oriented perpendicularly to side 15) may range between 10 μm and 200 μm, in particular between 20 μm and 100 μm. Lithium receiving chambers 14 may thus have a third height/depth h3 (which is oriented perpendicularly to side 15) between 10 μm and 200 μm, which may be between 20 μm and 100 μm. It is pointed out, however, that the numerical values stated here are to be interpreted as examples only.

The implementation of the at least two lithium receiving chambers 14 in current collector component 10 may take place, for example, with the aid of a rolling process. Thus, it is ensured that current collector component 10 having the at least two lithium receiving chambers 14 formed therein is easily manufacturable. The implementation of the method described here is, however, not limited to such a step of rolling.

Figure 1B:
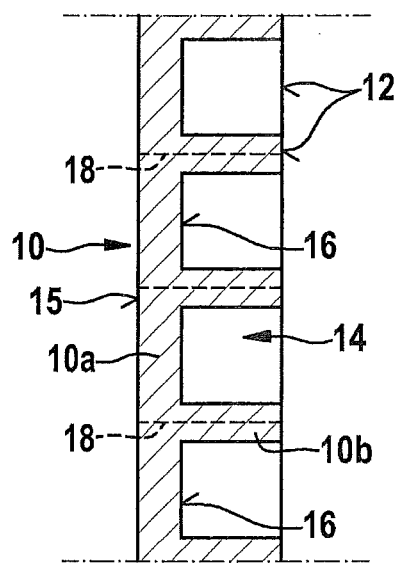
FIG. 1b shows another cross section for schematically illustrating one specific embodiment of the method for manufacturing a battery anode component.

In another method step which is represented in FIG. 1b, at least one predetermined breaking point 18 is formed between two adjacent lithium receiving chambers. Advantageously, a plurality of predetermined breaking points 18 is formed in each case between two adjacent lithium receiving chambers 14 in current collector component 10. The at least one predetermined breaking point 18 may, in particular, extend through base plate 10a and a web-shaped partition wall element 10b. The length of a predetermined breaking point 18/at least one predetermined breaking point section which runs through current collector component 10 may equals the sum of first height h1 of base plate 10a and second height h2 of a web-shaped partition wall element 10b.

The at least one predetermined breaking point 18 may also be referred to as a predetermined breaking line. Predetermined breaking point 18 may be understood to mean a point in the material of current collector component 10 at which the material is attenuated in a targeted manner in such a way that a break is facilitated exactly at/in the at least one predetermined breaking point 18 in the case of a mechanical force acting on current collector component 10.

The at least one predetermined breaking point 18 may also be formed in current collector component 10 with the aid of a rolling process. Likewise, the at least one predetermined breaking point 18 may also be formed at least in current collector component 10 with the aid of a laser process. As an alternative to forming the at least one predetermined breaking point 18 after the formation of current collector component 10 having the at least two lithium receiving chambers 14, it is also possible to generate the at least one predetermined breaking point 18 directly while forming/configuring the at least two lithium receiving chambers 14. It is also possible to describe this in other words, namely that the at least one predetermined breaking point 18 is inserted directly in the method step of texturizing current collector component 10.

Figure 1C:
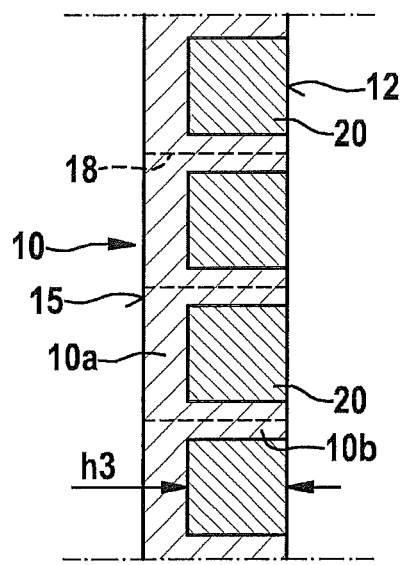
FIG. 1c shows another cross section for schematically illustrating one specific embodiment of the method for manufacturing a battery anode component.

In another method step, at least two lithium-based anode material units 20 are situated in the at least two lithium receiving chambers 14, as shown in FIG. 1c. One lithium-based anode material unit 20 may be integrated in each case into the at least two lithium receiving chambers 14.

A lithium-based anode material unit 20 may, for example, be understood to mean a filling of pure lithium. As an alternative thereto, a lithium-based anode material unit 20 may also have a mixture of lithium and at least one other material. The specific embodiment of the method step illustrated in FIG. 1c is not limited to the utilization of a certain material for lithium-based anode material unit 20.

For example, the at least two lithium-based anode material units 20 may be situated in the at least two lithium receiving chambers 14 by vapor coating of lithium receiving side 12, using (at least) lithium. Likewise, the at least two lithium receiving chambers 14 may be filled with a melted lithium, or with a lithium-based melted material, from which the at least two lithium-based anode material units 20 are formed. As an alternative thereto, the at least two lithium receiving chambers 14 may also be filled with a pressed lithium, or with a lithium-based pressed material, in that a lithium layer or a lithium-based layer is placed on lithium receiving side 12 in a solid state and is subsequently mechanically pressed into lithium receiving chambers 14 for the purpose of filling them.

The filling of the at least two lithium receiving chambers 14 may take place up to a filling level which is smaller than or equal to second height h2 of the at least one web-shaped partition wall element 10b and/or third height h3 of the at least two lithium receiving chambers 14. It is also possible to describe this in other words, namely that the at least two lithium receiving chambers 14 are filled maximally up to the web height of the at least one web-shaped partition wall element 10b. Optionally, the remainders of lithium or a lithium mixture which protrude beyond the at least one web-shaped partition wall element 10b may be removed mechanically and/or chemically. In this way, a planar surface finish of lithium receiving side 12 may be ensured despite the at least two lithium-based anode material units 20.

Figure 1D:
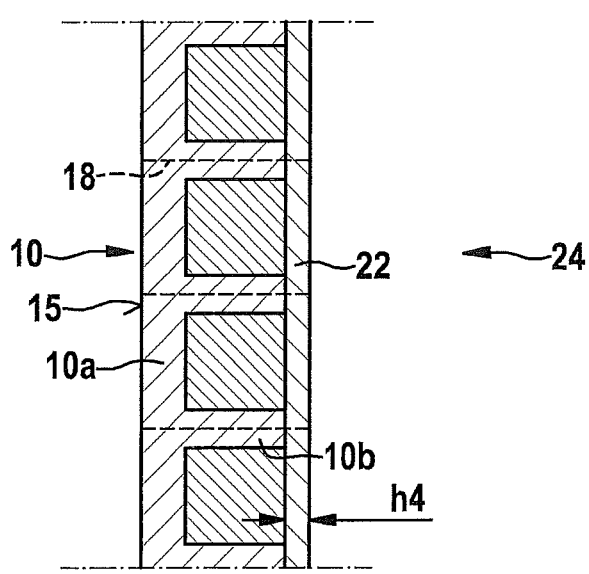
FIG. 1d shows another cross section for schematically illustrating one specific embodiment of the method for manufacturing a battery anode component.

In another method step which is illustrated in FIG. 1d, lithium receiving side 12 may be covered at least partially by a protective cover 22 in such a way that outer surfaces of the at least two lithium-based anode material units 20, which are exposed by current collector component 10, are covered (completely) with the aid of protective cover 22. This is accomplishable, for example, by applying a polymer layer and/or a ceramic layer to lithium receiving side 12 of the at least two lithium-based anode material units 20. As an alternative to the polymer layer and/or the ceramic layer, another ion-conductive material may, however, also be used for forming protective cover 22.

In one specific embodiment, at least one material is used to form protective cover 22 which has a greater adhesion toward the material of the at least two lithium-based anode material units 20 than toward a material of a cathode which is cooperating with the completely manufactured battery anode component 24/the finished battery anode. This ensures that protective cover 22 is fixedly held at the at least two lithium-based anode material units 20 even after a break of the at least one predetermined breaking point 18 and/or a tearing of the cathode.

The at least one predetermined breaking point 18 may be continued through protective cover 22. This may take place, for example, by repeating the laser process already described previously. Moreover, the at least one predetermined breaking point 18 may also be formed only after an application of protective cover 22, so that the at least one predetermined breaking point 18 is formed simultaneously in current collector component 10 and in protective cover 22.

The at least one predetermined breaking point 18 may run linearly/straight through current collector component 10 and protective cover 22 in each case. The at least one predetermined breaking point 18 may thus have a total length which equals a sum of a first height h1 of base plate 10a, a second height h2 of a web-shaped partition wall element 10b, and a fourth height h4 of protective cover 22 (which is oriented perpendicularly to side 15). A high safety standard which is described below is thus ensured even in the case of/after a comparatively high mechanical force acting on the completely manufactured battery anode component 24/the finished battery anode and a break of battery anode component 24/the battery anode.

Battery anode component 24 manufactured with the aid of the method steps described above may be subsequently situated/used in a battery anode or as a battery anode in a battery cell. At least one battery cell which is equipped with battery anode component 24, or at least one battery anode component 24, may be situated therein for manufacturing a battery. The battery manufactured in this way may be a (primary or secondary) lithium battery, for example. It is pointed out, however, that the usability of battery anode component 24 is not limited to a certain battery type of the lithium-based batteries.

Figure 2A:
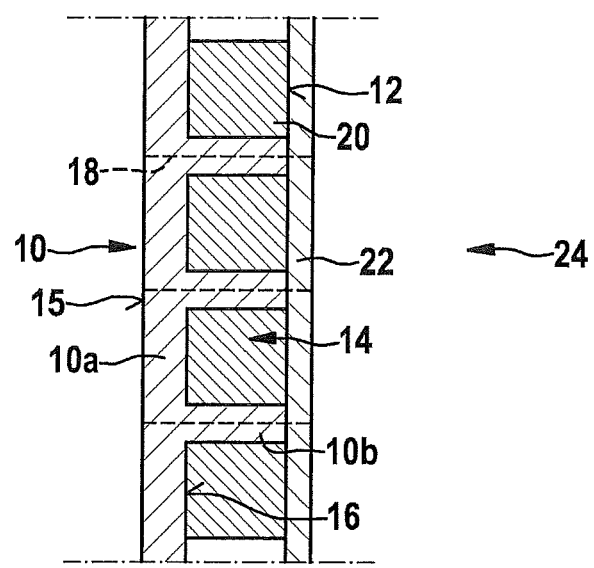
FIG. 2a shows a cross section for schematically illustrating one specific embodiment of the battery anode component.
Figure 2B:
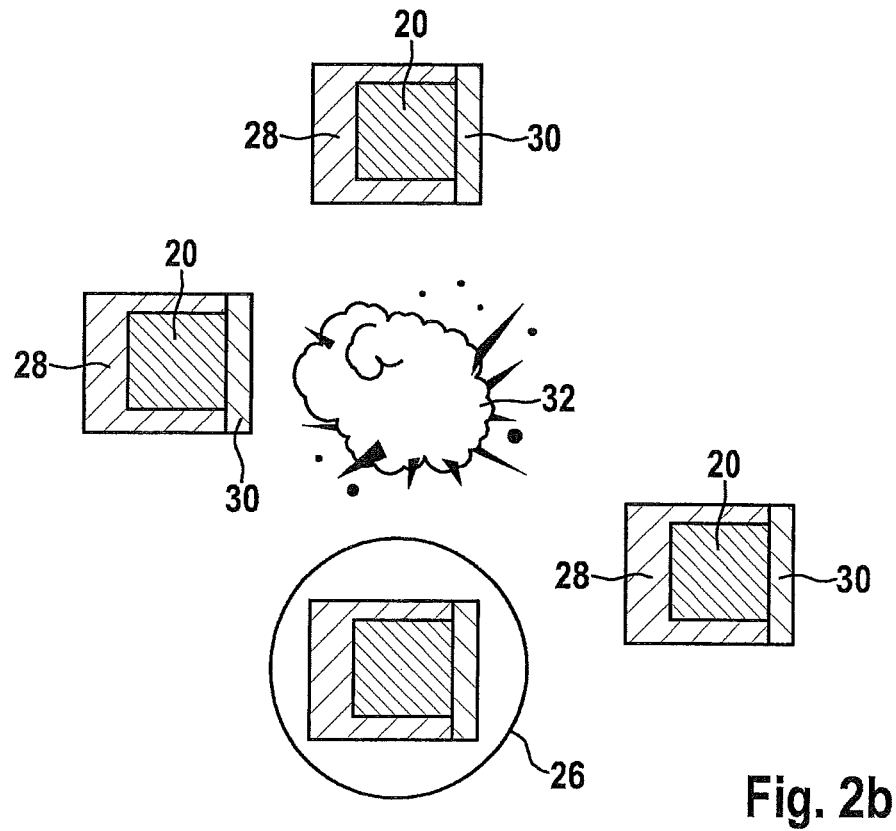
FIG. 2b shows another cross section for schematically illustrating one specific embodiment of the battery anode component.

FIGS. 2a and 2b show cross sections for schematically illustrating one specific embodiment of the battery anode component.

Battery anode component 24, which is schematically illustrated in FIG. 2a, includes a current collector component 10 having a lithium receiving side 12 in which at least two spatially separated recesses are formed as lithium receiving chambers 14. At least two lithium-based anode material units 20 are situated in the at least two lithium receiving chambers 14. Moreover, lithium receiving side 12 is covered at least partially by a protective cover 22 in such a way that outer surfaces of the at least two lithium-based anode material units 20, which are exposed by current collector component 10, are (completely) covered with the aid of protective cover 22. Battery anode component 24 may be formed with the aid of the manufacturing method described above. The manufacture of battery anode component 24 is, however, not limited to the completion of this manufacturing method.

In the specific embodiment of FIG. 2a, the at least two lithium receiving chambers 14 are structured into lithium receiving side 12 of current collector component 10 in such a way that a web-shaped partition wall element 10b protrudes from bottom surfaces 16 of two adjacent lithium receiving chambers 14 in each case. This embodiment of battery anode component 24 is, however, to be interpreted as an example only.

Current collector component 10, for example, includes nickel, copper and/or a stainless steel. Since the materials listed above do not/hardly react with lithium, an advantageously long service life of battery anode component 24 and its good stability are advantageously ensured. Protective cover 22 may be formed from at least one ion-conductive material. Protective cover 22 advantageously includes a polymer and/or a ceramic material. The implementability of protective cover 22 is, however, not limited to a certain material.

Battery anode component 24 may, for example, be a battery anode. In this case, the battery anode may be implemented in this case as a lithium anode, e.g., as a lithium alloy anode or a lithium metal anode. It is pointed out, however, that the implementability of battery anode component 24 is not limited to a certain type of a lithium-based battery anode.

In particular, battery anode component 24 may be a subunit of a battery cell. At least one battery cell of this type, or at least one battery anode component 24, may be used in a battery such as a (primary or secondary) lithium battery. In particular, the battery may include a plurality of battery anode components 24 or battery cells equipped therewith. The usability of battery anode component 24 or of the battery cell equipped therewith is not limited to a certain battery type of lithium-based batteries.

Due to the advantageous configuration of battery anode component 24, the at least two lithium-based anode material units 20 are reliably protected against an ingress of contamination or liquid. Even in the case of great air humidity or in the case of direct contact of battery anode component 24 with water, a reaction of the lithium which is contained in the at least two lithium-based anode material units 20 with water is reliably prevented. Battery anode component 24/the battery anode thus has a good safety standard. Moreover, the utilization of at least one battery anode component 24 in a (primary or secondary) lithium battery contributes to a significant increase in its safety standard.

Battery anode component 24 may be used (due to its good safety standard) in power tools, gardening tools, computers, notebooks, PDAs, mobile phones, hybrid vehicles, plug-in hybrid vehicles and/or electric vehicles. The usability of battery anode component 24 is, however, not limited to the examples listed here. Due to the good compliance with safety requirements which is described in greater detail below, battery anode component 24 is suitable for use, even after a break of battery anode component 24, in insertion positions, in particular, in which battery anode component 24 may be exposed even to a disproportionately great mechanical stress, such as in a hybrid vehicle, a plug-in hybrid vehicle, and an electric vehicle.

In the specific embodiment illustrated in FIG. 2*a*, battery anode component 24 has at least one predetermined breaking point 18 in current collector component 10 between two adjacent lithium receiving chambers 14. The at least one predetermined breaking point 18 may additionally extends through protective cover 22. (The at least one predetermined breaking point 18 is detectable, in particular, with the aid of microscopic analysis). It is pointed out, however, that the implementability of battery anode component 24 is not limited to the formation of the at least one predetermined breaking point 18 or a certain number of predetermined breaking points 18.

FIG. 2*b* shows the consequences of an exertion of a comparably high mechanical force on battery anode component 24 which is equipped with multiple predetermined breaking points 18. The at least one predetermined breaking point 18 is broken due to the exerted mechanical force. Thus, due to the break of battery anode component 24 at the at least one predetermined breaking point 18, the exerted energy may be dissipated in a targeted manner. It is thus preventable, for example, that the comparably high mechanical force which is frequently exerted, in particular, on battery anode component 24 in the case of an accident of a vehicle equipped therewith results in unforeseeable damage.

The break of battery anode component 24 at the at least one predetermined breaking point 18, e.g., due to an accident or an explosion, results in a targeted subdivision/a guided mechanical disintegration of battery anode component 24 into multiple compact fragments 26. As is apparent in FIG. 2*b*, each of compact fragments 26 has a lithium-based anode material unit 20 which is (fixedly and/or completely) enclosed by a current collector fraction 28 and a protective cover fraction 30. In this way, lithium-based anode material units 20 are enclosed in an airtight and/or in a liquid-tight manner due to the materials of current collector component 10 and protective cover 22 even after the subdivision of battery anode component 24 into multiple fragments 26. In this way, a contact of the lithium contained in a lithium-based anode material unit 20 with aerial oxygen or water (e.g., in the form of air humidity) is reliably prevented. As a result, a (strongly exothermal) reaction of the lithium contained in lithium-based anode material unit 20 with aerial oxygen or water is also excluded. Even in the case of a great force being exerted on compact fragments 26 or in the case of an explosion 32 in the close vicinity of compact fragments 26, a lithium fire is also reliably prevented for this reason.

Therefore, not only battery anode component 24, but also its compact fragments 26 have a significantly increased safety standard. For this reason, a comparably high number of battery anode components 24 may be safely used for safety-relevant applications, e.g., in particular, in a particularly large battery, without having to accept an increased safety risk due to the large/increased total quantity of lithium in battery anode components 24. Battery anode component 24 may thus also be used, in particular, for implementing safe hybrid vehicles, plug-in hybrid vehicles, and electric vehicles.

It is pointed out here again that the structural measures described above result in battery anode component 24 breaking only along the at least one predetermined breaking point 18 in the case of a severe accident or an explosion. The lithium contained in battery anode component 24 therefore does not directly contact the atmosphere (i.e., aerial oxygen and air humidity) or water (rain or firefighting water). Instead, the lithium which has previously been contained in battery anode component 24 still remains completely covered by the materials of current collector component 10 and protective cover 22 even after the mechanical disintegration. Harmful, since strongly exothermal, reactions of the lithium may thus generally be completely avoided.

What is claimed is:

1. A battery anode component for a battery cell, comprising:
a current collector component having a lithium receiving side in which at least two spatially separated recesses are formed as lithium receiving chambers;
at least two lithium-based anode material units which are situated in the at least two lithium receiving chambers; and
a protective cover which covers the lithium receiving side at least partially and with which outer surfaces of the at least two lithium-based anode material units which are exposed by the current collector component are covered,
wherein at least one predetermined breaking point is formed in the current collector component between two adjacent lithium receiving chambers.

2. The battery anode component of claim 1, wherein the at least one predetermined breaking point additionally extends through the protective cover.

3. The battery anode component of claim 1, wherein the protective cover is formed from at least one ion-conductive material.

4. The battery anode component of claim 1, wherein the protective cover includes at least one of a polymer material and a ceramic material.

5. The battery anode component of claim 1, wherein the current collector component includes at least one of nickel, copper and a stainless steel.

6. The battery anode component of claim 1, wherein the at least two lithium receiving chambers are formed at the lithium receiving side of the current collector component so that a web-shaped partition wall element protrudes from the bottom surfaces of the two adjacent lithium receiving chambers in each case.

7. A battery cell, comprising:
a battery anode component, including:
a current collector component having a lithium receiving side in which at least two spatially separated recesses are formed as lithium receiving chambers;
at least two lithium-based anode material units which are situated in the at least two lithium receiving chambers; and
a protective cover which covers the lithium receiving side at least partially and with which outer surfaces of the at least two lithium-based anode material units which are exposed by the current collector component are covered,
wherein at least one predetermined breaking point is formed in the current collector component between two adjacent lithium receiving chambers.

8. A battery, comprising:
at least one of the following:
(i) at least one battery anode component, including:
a current collector component having a lithium receiving side in which at least two spatially separated recesses are formed as lithium receiving chambers;
at least two lithium-based anode material units which are situated in the at least two lithium receiving chambers; and
a protective cover which covers the lithium receiving side at least partially and with which outer surfaces of the at least two lithium-based anode material units which are exposed by the current collector component are covered,
wherein at least one predetermined breaking point is formed in the current collector component between two adjacent lithium receiving chambers; and
(ii) at least one battery cell including the at least one battery anode component.

9. A method for manufacturing a battery anode component for a battery cell, the method comprising:
forming a current collector component having a lithium receiving side in which at least two spatially separated recesses are formed as lithium receiving chambers;
situating at least two lithium-based anode material units in the at least two lithium receiving chambers;
covering the lithium receiving side at least partially by a protective cover so that outer surfaces of the at least two lithium-based anode material units, which are exposed by the current collector component, are covered with the protective cover; and
forming at least one predetermined breaking point in the current collector component between two adjacent lithium receiving chambers.

10. The method of claim 9, wherein the at least one predetermined breaking point is formed at least in the current collector component with a laser process.

11. The method of claim 9, wherein the at least two lithium receiving chambers in the current collector component and/or the at least one predetermined breaking point in the current collector component are formed with a rolling process.

12. A method for manufacturing a battery cell, the method comprising:
manufacturing a battery anode component by performing the following:
forming a current collector component having a lithium receiving side in which at least two spatially separated recesses are formed as lithium receiving chambers;
situating at least two lithium-based anode material units in the at least two lithium receiving chambers;
covering the lithium receiving side at least partially by a protective cover so that outer surfaces of the at least two lithium-based anode material units, which are exposed by the current collector component, are covered with the protective cover; and
forming at least one predetermined breaking point in the current collector component between two adjacent lithium receiving chambers, and
situating the battery anode component in the battery cell.

13. A method for manufacturing a battery, the method comprising:
performing at least one of (i) and (ii) of the following:
(i) manufacturing at least one battery anode component by performing the following:
forming a current collector component having a lithium receiving side in which at least two spatially separated recesses are formed as lithium receiving chambers;
situating at least two lithium-based anode material units in the at least two lithium receiving chambers;
covering the lithium receiving side at least partially by a protective cover so that outer surfaces of the at least two lithium-based anode material units, which are exposed by the current collector component, are covered with the protective cover; and
forming at least one predetermined breaking point in the current collector component between two adjacent lithium receiving chambers; and
(ii) manufacturing at least one battery cell by performing the following:
manufacturing a battery anode component by performing the following:
forming a current collector component having a lithium receiving side in which at least two spatially separated recesses are formed as receiving chambers;
situating at least two lithium-based anode material units in the at least two lithium receiving chambers;
covering the lithium receiving side at least partially by a protective cover so that outer surfaces of the at least two lithium-based anode material units, which are exposed by the current collector component, are covered with the protective cover; and forming at least one predetermined breaking point in the current collector component between two adjacent lithium receiving chambers; and situating the battery anode component in the battery cell; and situating the at least one of at least one battery anode component and at least one battery cell in the battery.

14. The battery anode of claim 1, wherein the protective cover covers the recesses and protects any content of the recesses.

15. The battery anode of claim 14, wherein the breaking point extends through the protective cover.

16. The battery cell of claim 7, wherein the protective cover covers the recesses and protects the lithium-based anode material units.

17. The battery cell of claim 16, wherein the breaking point extends through the protective cover.

18. The battery of claim 8, wherein the protective cover covers the recesses and protects the lithium-based anode material units.

19. The battery of claim 18, wherein the breaking point extends through the protective cover.

20. The battery anode component of claim 6, wherein a distance between a bottom surface of a lithium receiving chamber and a bottom surface of the current collector component, a height of a web-shaped partition wall element, and a depth of a lithium receiving chamber each range between 10 micrometers and 200 micrometers, and wherein the width of a lithium receiving chamber ranges between 100 micrometers and 25 millimeters.

* * * * *